United States Patent [19]

Eadie et al.

[11] Patent Number: 4,995,983
[45] Date of Patent: Feb. 26, 1991

[54] MEMBRANE SEPARATION PROCESS

[75] Inventors: Donald T. Eadie, North Vancouver; Thomas M. Fyles, Victoria, both of Canada

[73] Assignee: MacMillan Bloedel Limited

[21] Appl. No.: 496,576

[22] Filed: Mar. 21, 1990

[51] Int. Cl.$^5$ ............................................. B01D 61/16
[52] U.S. Cl. ................................... 210/639; 210/641; 210/651
[58] Field of Search .............. 210/639, 641, 651, 652; 162/40, 65, 81

[56] References Cited

U.S. PATENT DOCUMENTS 4,574,049 3/1986 Pittner ................................. 210/639
4,602,982 7/1986 Samuelson ........................ 162/81 X Primary Examiner—Frank Spear
Attorney, Agent, or Firm—C. A. Rowley

[57] ABSTRACT

It has been found that certain chemicals such as peroxide may be concentrated in an aqueous solution by increasing the pH of a feed liquor to increase the amount of the chemcial in an ionized form, i.e. increase the ionized fraction and then separating the feed liquor by reverse osmosis through a reverse osmosis membrane into a retentate having an enhanced concentration of chemical in ionized form relative to the feed liquor and a permeate having a reduced concentration of chemical in ionized form relative to the feed liquor. The process is particularly suited to increasing the concentration of hydrogen peroxide.

12 Claims, 3 Drawing Sheets

MEMBRANE SEPARATION PROCESS

FIELD OF THE INVENTION

The present invention relates to membrane separation of materials in solution by converting the materials into ionized salts and then performing a reverse osmosis separation through a membrane. More particularly the present invention relates to the increasing of the concentration of peroxide by ionizing peroxide contained in a feed liquor and then separating the feed liquor into a permeate decreased in peroxide and a retentate enriched in peroxide relative to the feed liquor. More particularly the present invention relates to a process for recovering peroxide used in the treatment of wood pulp by first separating an effluent stream into a peroxide containing solution and a contaminant enriched solution and preferably then increasing the peroxide concentration of the peroxide containing solution.

BACKGROUND OF THE PRESENT INVENTION

Throughout this application, it is to be understood that the term peroxide is intended to mean the total of all peroxide in the solution including the ionized fraction and the un-ionized fraction, i.e. the salts of peroxide $HO_2^-$ ions, which generally form the ionized fraction and the $H_2O_2$ which forms the un-ionized or neutral fraction.

The use of membranes to separate materials from water by reverse osmosis is a well known technology. Many different membranes have been devised generally each for a very specific purpose in mind, i.e. to invoke a specific separation of selected material from water or other liquids to increase the concentration of the selected material. In the processes of which applicant is aware, the feed liquor is fed to a membrane which separates the feed liquor into a retentate and a permeate using a membrane specifically designed to obtain the desired type of separation. Generally this process is used to produce water of higher purity from water containing contaminants, the retentate contains the contaminants at the higher concentration than the incoming water and the permeate provides the purified water.

In the process of producing hydrogen peroxide, the hydrogen peroxide is generally produced as an aqueous solution containing both peroxide and anthraquinone. The anthraquinone is separated by means of an organic solvent to produce a low concentration solution of peroxide in water. The concentration of hydrogen peroxide in the solution is increased by evaporating water from the solution.

In the production of pulp from cellulosic material, for example in the manufacture of paper, hydrogen peroxide is used in various ways. It is most commonly used for bleaching mechanical pulp, for example stone groundwood, thermo-mechanical pulp (TMP), or chemi-thermo-mechanical pulp (CTMP). It is also known to use hydrogen peroxide in the bleaching of so-called chemical pulps namely pulp from the kraft or sulfite processes or other chemical pulps. A common means of employing hydrogen peroxide in this case is in the caustic extraction stage. It is also known to use peroxide, particularly alkaline peroxide to treat wood chips in refining processes to produce a mechanical pulp as well as in de-inking and recovery of secondary fibre, for example from old newspapers.

In the bleaching of chemical pulp with hydrogen peroxide, no attempt is made to recover residual peroxide. Similarly in the mechanical pulping processes dilute residual peroxide may be recirculated although it is not known to purify or concentrate this stream.

In the bleaching of mechanical pulp using hydrogen peroxide the bleaching is normally carried out at a consistency (solids content) of 3–40%, most usually 12 to 30%. At the end of the brightening reaction, a considerable portion of the original charge of peroxide is normally present in the liquid phase. A residual peroxide containing liquid stream can be separated from the pulp using a thickening device such as a press. Some attempts have been made to reuse the residual peroxide by recirculating this stream to an earlier stage in the brightening process or by using it to brighten a second portion of the pulp. These processes are known by the applicant to encounter problems for at least two reasons: (1) In the bleaching of pulp with hydrogen peroxide, undesirable materials are generated in the liquid phase by the brightening reactions. In a recycle process using dilute residual peroxide, these undesirable material build up, and adversely affect the bleaching reaction efficiency. (2) Because of the dilution and rethickening stage required to recover a solution of residual hydrogen peroxide for reuse, the concentration of recovered hydrogen peroxide in these processes will be low. This has the disadvantage of liquid and stock handling problems due to the low consistency (solids content) in the process where the residual peroxide is reused.

BRIEF DESCRIPTION OF THE PRESENT INVENTION

It is an object of the present invention to provide a system for treating a material by converting it to an ionized form then increasing the concentration of the material using a reverse osmosis membrane.

It is a further object of the present invention to increase the concentration of a peroxide solution by increasing the amount of an ionized fraction of the peroxide and thereafter separating the solution using a reverse osmosis membrane to increase the peroxide concentration in a retentate while decreasing the concentration of the peroxide in a permeate passing through the membrane relative to the incoming peroxide solution.

It is yet another object of the present invention to provide a peroxide recovery system particularly adapted for recovery of peroxide used to treat organic materials more particularly pulp for making paper products to provide a residual peroxide for reuse, by separating a residual contaminant containing solution from the treated material, separating a solution of peroxide from the residual contaminant containing solution and preferably increasing the concentration of the peroxide in the solution of peroxide separated from the contaminant containing solution.

Broadly the present invention relates to a method of increasing the concentration of a chemical in an aqueous solution comprising separating a feed liquor solution containing said chemical into a retentate and a permeate via reverse osmosis through a membrane the improvement comprising ionizing at least a major portion of said chemical contained in said feed liquor to provide an ionized feed liquor containing an ionized fraction, passing a portion of said ionized solution through said membrane to separate said ionized feed liquor into a permeate having a lower concentration of said ionized fraction relative to said ionized feed liquor and a retentate having a higher concentration of said ionized fraction than said ionized solution thereby to increase the concentration of said chemical in said retentate relative to the concentration of said chemical in said feed liquor.

Preferably said chemical will be hydrogen peroxide and said chemical will be ionized by increasing the pH of said feed liquor to a pH of at least 11.5.

The present invention also broadly relates to recovery of residual peroxide in the manufacture of cellulose pulp comprising separating an effluent containing residual peroxide and contaminants from said pulp, separating said effluent into a first retentate and a first permeate by a reverse osmosis or an ultrafiltration membrane, said first permeate containing a major portion of said residual peroxide and a minor portion of said contaminants, increasing the pH of said first permeate to ionize said residual peroxide in said first permeate to increase the ionized fraction of said peroxide and provide a high pH permeate, separating said high pH permeate via a reverse osmosis membrane into a second retentate and a second permeate, said second permeate having a lower concentration of said peroxide and said second retentate having a higher concentration of said peroxide than said first permeate.

Preferably the pH of said high pH permeate is above a pH of 12.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
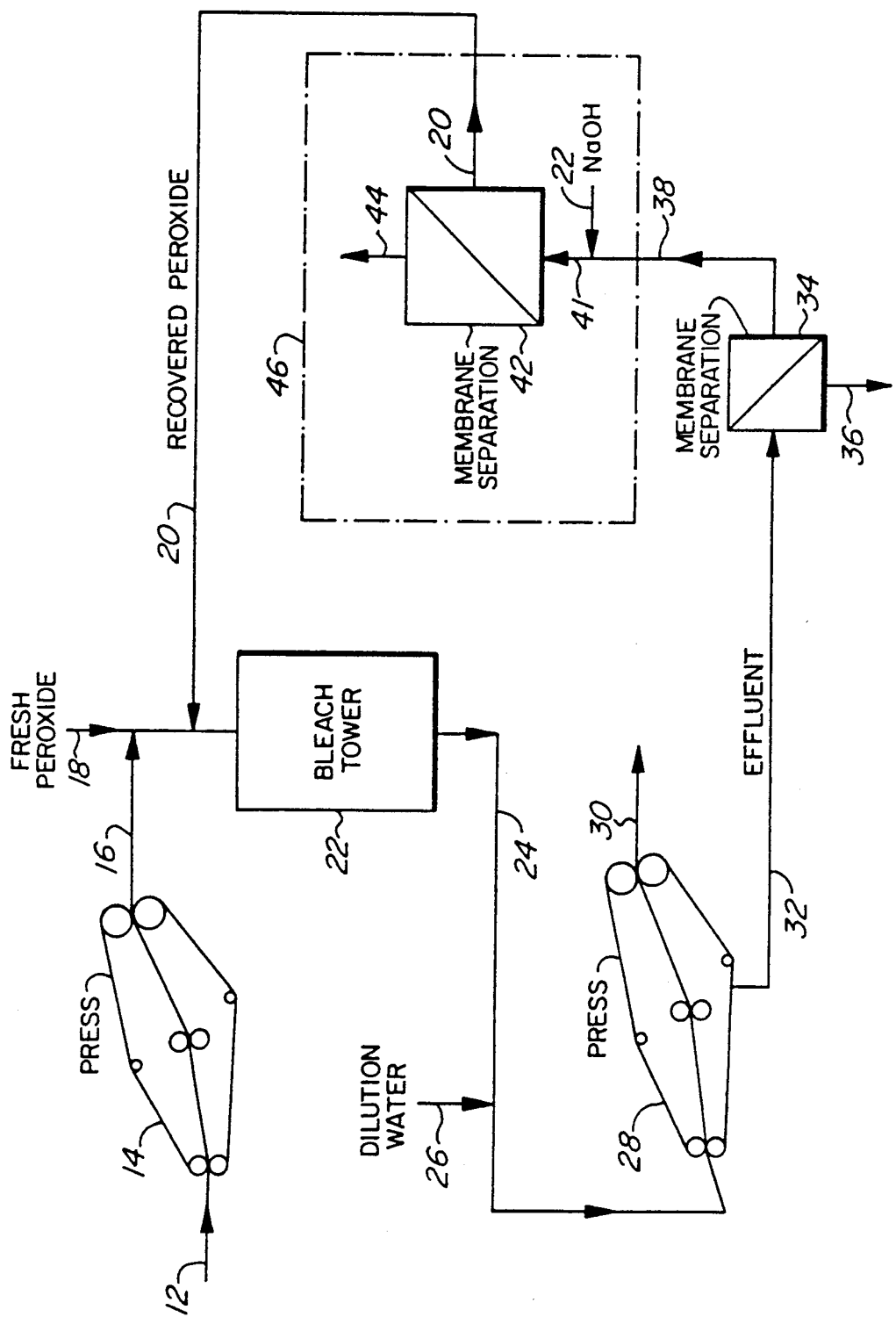
FIG. 1 is a schematic illustration of a pulp bleaching system incorporating the present invention.

FIG. 1 illustrates one form of a bleaching system for bleaching wood pulp using the present invention. However, it will be understood that the present invention can be used with other peroxide containing streams and that the bleaching system is only an example of one source of peroxide containing stream that may be treated using the present invention. For example, the peroxide recovery process of the invention may be used to remove peroxide from the bleaching process such as described in U.S. Pat. No. 4,734,160 issued Mar. 29, 1988 to Moldenius and provide a source of high concentrated peroxide for reuse as described in the process. Similarly the peroxide recovery process of the invention may be used to recover peroxide in pulping processes such as that described in U.S. Pat. No. 4,718,980 issued June 12, 1980 to Lowrie et al and the concentrated recovered peroxide be used as desired.

Referring to FIG. 1 pulp enters the system as indicated at 12 and passes through a press 14 to increase the consistency of the pulp (generally to at least 20%) in line 16. Fresh peroxide is added as indicated by the arrow 18 and recirculated recovered peroxide is added as indicated by the arrow 20 to the concentrated pulp to provide a pulp (generally at 10-30% consistency) to the bleaching tower 22. The pulp is retained in the tower 22 for the length of the time required to complete the peroxide bleaching operation.

The fresh peroxide added may contain suitable stabilizers or the peroxide may be added and then the pH increased to form perhydroxyl ions in situ in the pulp for the bleaching operations using known techniques.

The bleached pulp leaves the bleaching tower in line 24 and is diluted by dilution water added as indicated at 26. The diluted bleached pulp passes to a second press 28 which increases the consistency of the bleached pulp (for example to about a 30% consistency) as indicated at 30 and provides an effluent stream containing residual peroxide plus contaminants in line 32.

The residual peroxide in the effluent stream 32 containing residual peroxide and contaminants is recovered preferably by first separating the effluent, using a membrane separator, i.e. a reverse osmosis or ultra filtration membrane as indicated at 34, into a first retentate in line 36 and a first permeate that passes through the membrane and is conducted from separation zone 34 via line 38. The first permeate in line 38 has less of the contaminants than the retentate in line 36 and provides an aqueous solution of recoverable hydrogen peroxide.

The solution of peroxide in line 38 is treated with a suitable soluble base, preferably sodium hydroxide, as indicated by the arrow 40 to raise the pH and thereby increase the fraction of the peroxide in ionic form, i.e. increase the ionized fraction and provide a high pH stream in line 41. Preferably the pH in line 41 will be at least 11.5 and most preferably between 12 and 13 thereby preferably to increase the ionized fraction of peroxide to at least 80%. Peroxide stabilizers such as sodium silicate may be added to the stream at this point.

The high pH permeate solution in line 41 then passes into a reverse osmosis membrane separation zone or chamber 42 which permits the passage of water through the membrane to form a second permeate with a peroxide concentration significantly lower than that of the high pH permeate. The second permeate exits the chamber 42 as indicated at 44 and may be disposed of. A second retentate leaves the zone 42 as indicated by line 20 and contains the recovered concentrated peroxide which in the illustrated arrangement is fed to the incoming pulp stream in line 16.

It will be apparent that the separation stage provided by the reverse osmosis membrane 42 could be applied to other peroxide containing aqueous solutions, for example in a hydrogen peroxide manufacturing plant the peroxide solution in the line 38 would be the solution of peroxide after separation of the anthraquinone and its pH increased and fed to a reverse osmosis membrane to increase the concentration of the peroxide in the retained fraction thereby to provide a more concentrated solution of peroxide.

It will be evident to those skilled in the art that in the concept described may also be applied to other chemicals containing the peroxide functionality, i.e. ROOH, where R may an alkyl, aryl, or acetyl group.

The elements within the box outlined in dot dash line and indicated at 46 could be used for a variety of different incoming peroxide streams in line 38 to first convert them to salts by for example changing the pH of the incoming solution and then subjecting the converted (ionized) solutions to separation by reverse osmosis.

It is preferred to carry out a first separation to separate the majority of the contaminants from the effluent (feed) stream before increasing the pH and increasing the peroxide concentration in the retentate from a reverse osmosis separation process, however, depending on how the recovered peroxide is to be used it is also possible to increase the pH of the effluent and separate via reverse osmosis to provide a stream of peroxide of higher concentration than the effluent but containing the contaminants (i.e. omit the first separation step).

The present invention will be further explained with respect to FIGS. 2, 3, 4 and 5 which are related specifically to peroxide recovery.

Figure 2:
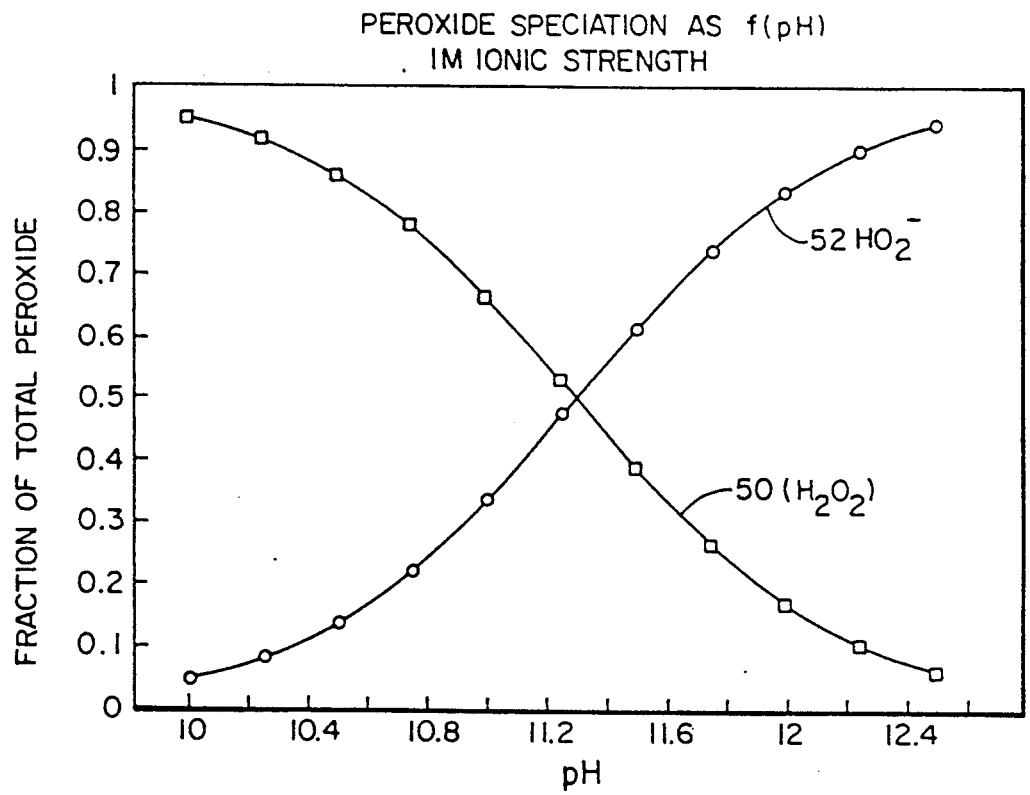
FIG. 2 is a graph illustrating peroxide speciation at various pHs.

As shown in FIG. 2 the curve 50 for hydrogen peroxide concentration expressed as fractions of total peroxide in the system shows that peroxide in the $H_2O_2$ form decreases rapidly with increase in pH. The concentration of the $HO_2^-$ ions in the solution on the other hand as indicated by the curve 52 increases rapidly as the pH is increased there being about a 50/50 solution of $H_2O_2$ and $HO_2^-$ ions at a pH of about 11.5. Since reverse osmosis membranes normally permit passage of water and low molecular weight material in solution and resist passage of ions it is preferred to operate the system (membrane 42) by adding sufficient caustic to raise the pH of the incoming stream in line 41 to above 11.5 and preferably above about 12.5 to convert the majority of the $H_2O_2$ to $HO_2^-$.

For these purposes the following definitions apply:

Total peroxide rejection factor =
$$1 - \frac{\text{(total peroxide in permeate)}}{\text{(total peroxide in feed solution)}}$$

Salt rejection coefficient =
$$1 - \frac{\text{(peroxide salt in permeate)}}{\text{peroxide salt in retentate}}$$

Neutral ($H_2O_2$) rejection coefficient =
$$1 - \frac{(H_2O_2) \text{ concentration in permeate}}{(H_2O_2) \text{ concentration in retentate}}$$

Figure 3:
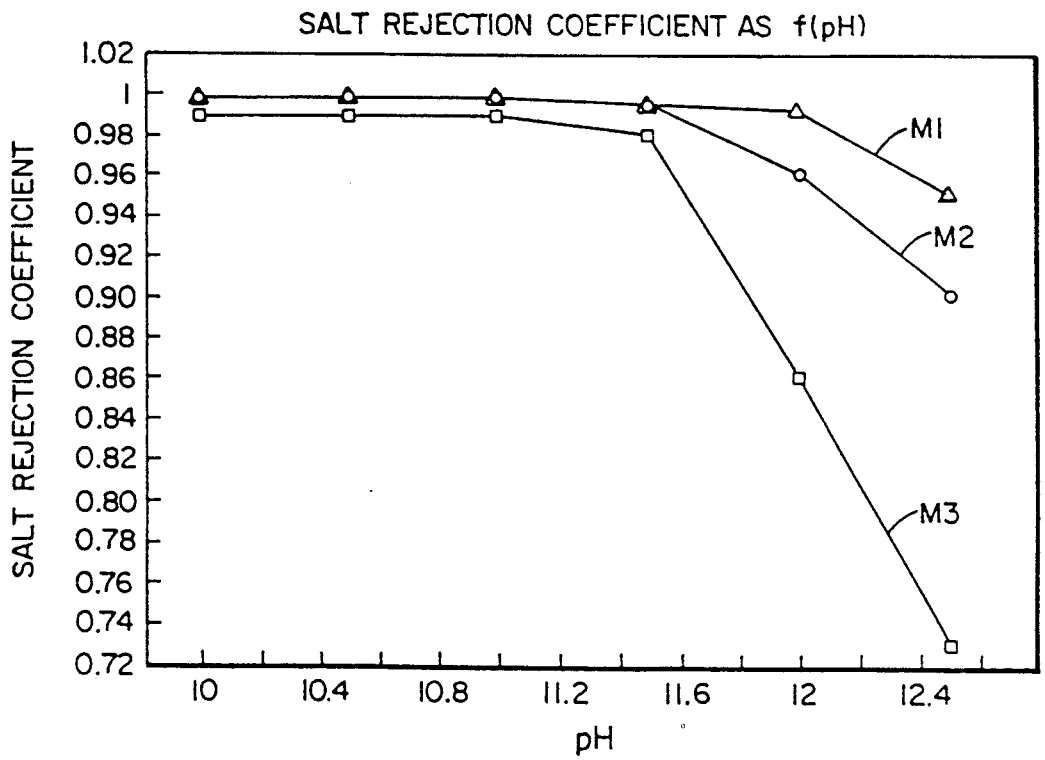
FIG. 3 shows salt rejection coefficients of different membranes tested as a function of pH.

Not all membranes behave in the same way and thus it is important to select a membrane that will function well under the operating conditions, e.g. high pH and will have a very high salt rejection factor for the $HO_2^-$ ions. In FIG. 3, three membranes are compared and have been indicated as $M_1$, $M_2$ and $M_3$ respectively. In these examples the membrane $M_1$ is the most efficient, particularly at the pHs that are intended to be used, i.e. above 11.5 and preferably above 12.

The graphs in FIG. 3 shows salt ($HO_2^-$ ions) rejection co-efficients for various different membranes tested. Considering operation at a pH of 12 it will be apparent that the $M_1$ membrane has a very high salt rejection co-efficient (low ion permeability). The $M_2$ membrane had lower rejection co-efficient (higher ion permeability) than the $M_1$ membrane and the $M_3$ membrane had the lowest rejection co-efficient (highest ion permeability) of the three. Thus with these membranes the $M_1$ will retain substantially all or a very high percentage of the $HO_2^-$ ions, the $M_2$ less than $M_1$, but significantly more than either or the $M_3$ membranes.

It is also important to retain as much of the $H_2O_2$ molecules in the retentate as possible when the retentate is the stream used in the recovery of peroxide as any $H_2O_2$ ions in the recovered stream obviously will improve recovery of peroxide.

Figure 4:
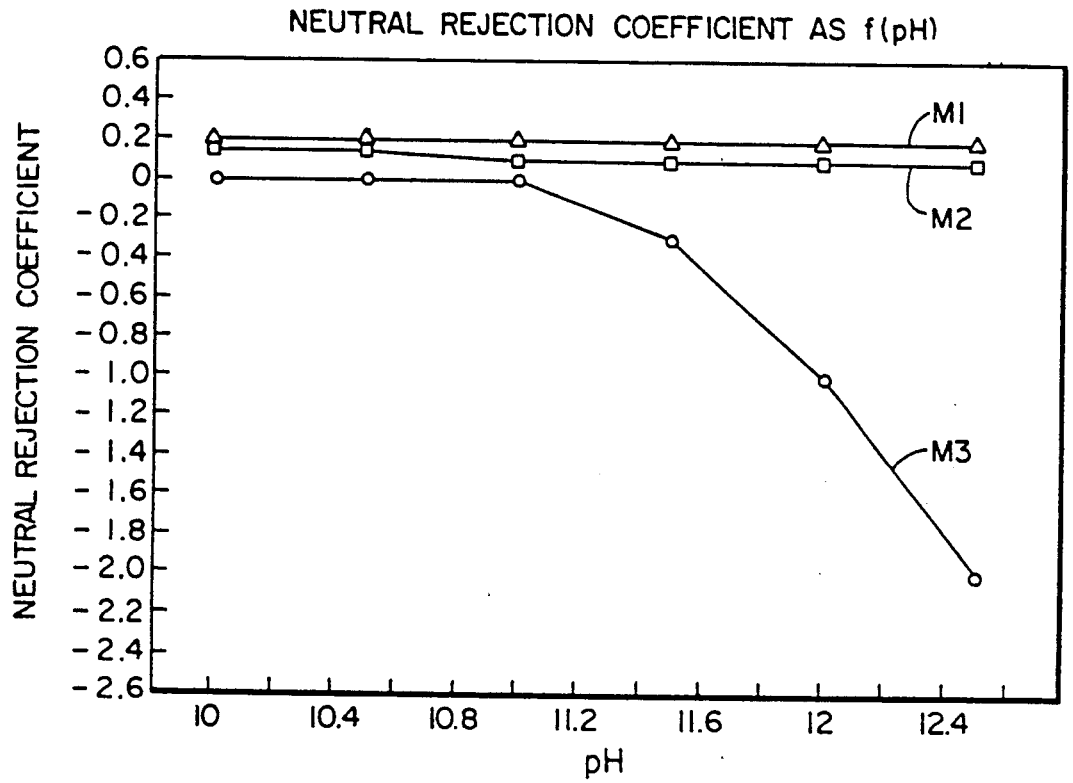
FIG. 4 shows $H_2O_2$ rejection coefficient of the different membranes tested as a function of pH.

The graphs of FIG. 4 show the rejection co-efficient as a function of pH for $H_2O_2$ for the various membranes. It is apparent that membrane $M_1$ retains more of the $H_2O_2$ than does $M_2$ or $M_3$ and $M_3$ permits the material at a pH above about 11.5 to pass relatively freely therethrough so that the majority of the $H_2O_2$, if the $M_3$ membrane were to be used, would pass through the membrane.

Figure 5:
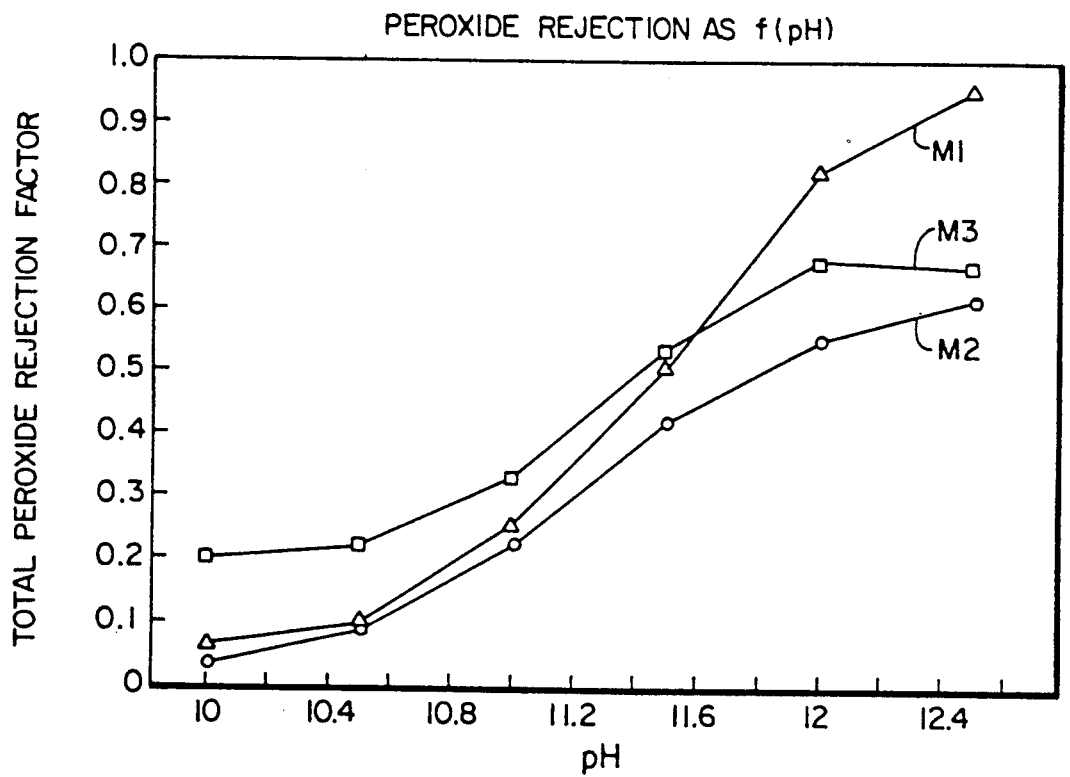
FIG. 5 shows peroxide rejection as a function of pH for the various membranes tested.

The graphs of FIG. 5 shows the total peroxide rejection factor as a function of pH for membranes $M_1$, $M_2$ and $M_3$. It is apparent that at a pH above 11.5, membrane $M_1$ is highly effective for rejection of peroxide, thereby concentrating peroxide in the retentate stream. $M_3$ and $M_2$ are also effective, but less so than $M_1$.

EXAMPLE 1

In a particular application of the present invention using a membrane provided by Osmonics and designated by the tradename MS11 an incoming stream of 400 mL of solution containing 3.24 g/L of peroxide at a pH of 12 was subjected to reverse osmosis. When the retained volume was 350 mL the retentate had a concentration of 3.46 g/L of peroxide, a pH of 12.02 while the permeate has a concentration of peroxide of 0.52 g/L and a pH of 11. As more the volume of the solution passed through the membrane to provide 100 mL of retentate, the peroxide in the retentate increased to 10.2 g/L and the pH increased to 12.5 while the peroxide in the permeate only increased to 0.59 g/L and the pH increased to 11.01. The overall rejection of peroxide was 80-84 percent and the final mass balance on the experiment was 88%.

It will be apparent that with a significantly large area of membrane the concentration of peroxide in the retentate may be very significantly increased, thereby to facilitate the reuse of the recovered peroxide.

EXAMPLE 2

Production of dilute residual peroxide solution

A sample of mechanical pulp (Pulp A) which had been pretreated with 0.15% DTPA (diethylenetriamine pentaacetic acid pentasodium salt) and thickened to 31% consistency was brightened at 60° C. for 90 minutes using fresh brightening chemicals (hydrogen peroxide, sodium hydroxide, sodium silicate, and magnesium sulphate), with the results shown below:

| Experment # | 1 | 2 | 3 | 4 |
|---|---|---|---|---|
| Pulp initial Brightness (Elrepho) | 54.0 | 54.0 | 54.0 | 54.0 |
| Peroxide application (wt % on pulp) | 5.5 | 5.5 | 5.5 | 5.0 |
| NaOH application (wt % on pulp) | 2.75 | 3.3 | 3.85 | 5.0 |
| NaOH/$H_2O_2$ | 0.5 | 0.6 | 0.7 | 1.0 |
| Silicate application (wt % 41° Baume solution on pulp) | 3.5 | 3.5 | 3.5 | 3.5 |
| Magnesium sulphate (Wt % on pulp) | 0.05 | 0.05 | 0.05 | 0.05 |
| Brightening Consistency | 25 | 25 | 25 | 15 |
| Final Brightness (Elrepho) | 77.0 | 78.0 | 77.2 | 77.2 |
| Residual peroxide (wt % on pulp) | 2.1 | 1.86 | 1.59 | 1.0 |

An effluent solution containing the residual peroxide was obtained from Experiments #1, 2 and 3 by diluting the brightened pulp to 10% consistency and rethickening to about 29% consistency. These solutions had the following characteristics:

| Experiment # | 1 | 2 | 3 |
| --- | --- | --- | --- |
| pH | 7.8 | 7.7 | 7.8 |
| Peroxide, g/L | 2.69 | 2.11 | 1.97 |
| Effluent Solution designation | A | B | C |

EXAMPLE 3

Two stage peroxide recovery process

Effluent solution B from Example 2 was filtered. A first reverse osmosis stage of the peroxide recovery process was carried out to separate the residual peroxide from contaminants using a membrane sold by Osmonics under the trade designation MS05 to provide 2000 mL permeate as essentially pure dilute hydrogen peroxide (1.83 g/L). To this permeate was added 94.9 mL of 1.0M NaOH to give a pH of 12.0, plus 3.98 g of sodium silicate and 0.38 g of DTPA. This solution was passed through the second reverse osmosis step of a two stage process using an Osmonics membrane sold under the trade designation MS11, and gave 200 mL of recovered retentate containing 8.5 g/L peroxide, at a pH of 13.6.

EXAMPLE 4

Two stage peroxide recovery process

Effluent solution A from Example 2 was filtered and a first step of a two stage reverse osmosis process was carried out using the Osmonics MS05 membrane to give 1.15 L of permeate having a peroxide concentration of 2.42 g/L. To the permeate was added 76 mL of 1.0 molar NaOH, 2.94 g sodium silicate, and 0.475 g DTPA. The resulting solution was passed through a peroxide concentration (second) stage reverse osmosis step using Osmonics MS11 membrane to produce 250 mL of retentate having a peroxide concentration of 7.64 g/L peroxide.

EXAMPLE 5

Brightening pulp with peroxide recovered from two stage peroxide recovery process The recovered retentate of Example 3 containing concentrated peroxide was used for brightening of a sample of mechanical pulp A. The recovered peroxide added to the pulp had a concentration of 5.44 g/L, and a total alkali concentration of 19.0 g/L (expressed as weight equivalents of NaOH). Brightening of pulp A was carried out with a mixture of this recovered concentrated peroxide and fresh peroxide at 60° C. for 90 minutes:

| Experiment # | 5 | 6 | 7 | 4 |
| --- | --- | --- | --- | --- |
| Recovered peroxide wt % on pulp | 1.4 | 2.0 | 2.0 | 0 |
| Fresh peroxide, wt % on pulp | 3.6 | 3.0 | 3.0 | 5.0 |
| Total peroxide, wt % on pulp | 5.0 | 5.0 | 5.0 | 5.0 |
| NaOH/H$_2$O$_2$ | 0.7 | 1.0 | 1.0 | 1.0 |
| Silicate application (wt % 41 Baume solution on pulp) | 0 | 0 | 3.5 | 3.5 |
| Brightening Consistency | 15 | 15 | 15 | 15 |
| Final Brightness (Elrepho) | 76.8 | 77.7 | 77.1 | 77.2 |
| Residual peroxide, (wt % on pulp) | 2.3 | 1.6 | 1.6 | 1.0 |

Comparison of these results with that for fresh peroxide alone (Experiment #4) shows that peroxide recovered and concentrated by the process of the invention has a brightening activity equivalent to that of fresh peroxide. In addition brightening with the recovered peroxide also leads to high residual peroxide levels in the effluent suitable for further recovery and recycle.

EXAMPLE 6

Single stage peroxide recovery process

Effluent solution B was filtered and to 1.75 L of the filtered solution B (2.03 g/L) 113 mL of 1.0 molar NaOH were added to give a solution pH of 12.0. The so treated solution at pH 12 was subject to a single reverse osmosis stage using Osmonics MS11 membrane, giving 250 mL of retentate with a peroxide concentration of 4.73 g/L (and containing contaminants from the bleaching stage).

EXAMPLE 7

Brightening pulp with peroxide recovered from single stage peroxide recovery process of Example 6

Recovered retentate from Example 6 was used for brightening mechanical pulp A. The recovered retentate had a peroxide concentration of 4.08 g/L and a total alkali concentration of 18.1 g/L (expressed as weight equivalents of NaOH) and contained other contaminants from the previous bleaching operation. Brightening of Pulp A was carried out with a mixture of fresh and the recovered peroxide from Example 6 at 60° C. for 90 minutes:

| Experiment # | 8 | 9 | 10 | 4 |
| --- | --- | --- | --- | --- |
| Recovered peroxide from Example 6 wt % on pulp | 1.13 | 1.45 | 1.45 | 0 |
| Fresh peroxide, wt % on pulp | 3.87 | 3.55 | 3.55 | 5.0 |
| Total peroxide, wt % on pulp | 5.00 | 5.00 | 5.00 | 5.0 |
| NaOH/H$_2$O$_2$ | 0.7 | 1.0 | 1.0 | 1.0 |
| Silicate application (wt % 41 Baume solution on pulp) | 0 | 0 | 3.5 | 3.5 |
| Brightening Consistency | 15 | 15 | 15 | 15 |
| Final Brightness (Elrepho) | 77.2 | 76.5 | 75.7 | 77.2 |
| Residual Peroxide (wt % on pulp) | 1.85 | 1.45 | 1.35 | 1.0 |

These results show that in this case the single stage process for recovering peroxide is as effective as fresh peroxide, and as effective as the two stage process for recovering peroxide (Experiments 5, 6 and 7 in Example 5). However as the concentrated contaminants in the recycled solutions build up with repeated recycling further steps to reduce the concentration of contaminants may be required after a period of time.

EXAMPLE 8

This example provides further illustration of the invention using the two stage process for recovering residual peroxide.

Recovered, concentrated peroxide produced as described in Example 4 (retentate) was used for brightening mechanical pulp A. This recovered peroxide had a concentration of 7.14 g/L and a total alkali concentration of 15.2 g/L (expressed as weight equivalents of NaOH). Brightening of pulp A was carried out with a mixture of fresh and recovered peroxide from Example 4 at 60° C. and 90 minutes:

| Experiment # | 11 | 12 | 13 | 14 | 4 |
| --- | --- | --- | --- | --- | --- |
| Recovered peroxide from Example 4 wt % on pulp | 2.34 | 2.34 | 2.18 | 2.18 | 0 |
| Fresh peroxide, wt % on pulp | 2.66 | 2.66 | 2.82 | 2.82 | 5.0 |
| Total peroxide, wt % on pulp | 5.00 | 5.00 | 5.0 | 5.0 | 5.0 |
| NaOH/$H_2O_2$ | 0.9 | 0.9 | 1.0 | 1.0 | 1.0 |
| Silicate application (wt % 41 Baume solution on pulp) | 0 | 1.4 | 0 | 3.5 | 3.5 |
| Brightening Consistency | 15 | 15 | 15 | 15 | |
| Final Brightness (Elrepho) | 78.3 | 77.8 | 76.9 | 76.1 | 77.2 |
| Residual peroxide, (wt % on pulp) | 1.6 | 1.7 | 1.7 | 1.85 | 1.0 |

This Example again demonstrates the utility of the invention for providing recovered peroxide useful for brightening.

Having described the invention modifications will be evident to those skilled in the art without departing from the spirit of the invention as defined in the appended claims.

We claim:

1. A method of recovering peroxide in the manufacture of cellulose pulp comprising separating an effluent containing said peroxide from said pulp, separating said effluent into a retentate and a permeate via a reverse osmosis through a membrane ionizing said peroxide contained in said effluent by converting said peroxide to an ionized formed by adding a suitable alkali to said effluent to increase the pH of said effluent, said membrane passing a permeate low in said peroxide in said ionized form and retaining a retentate having a concentration of said peroxide in ionized form higher than said effluent thereby to increase the concentration of said peroxide in said retentate relative to the concentration of said peroxide effluent and reusing said retentate by application to a further portion of cellulosic pulp.

2. A method as defined in claim 1 wherein said chemical is a peroxide and wherein said converting of said chemical to an ionized form comprises increasing the pH of said feed liquor to a pH of at least 11.5.

3. A method as defined in claim 2 wherein said peroxide is hydrogen peroxide.

4. A method of recovering residual peroxide in the manufacture of cellulose pulp comprising separating an effluent containing residual peroxide and contaminants from said pulp, separating said effluent into a first retentate and a first permeate by a first separation membrane, said first permeate containing a major portion of said residual peroxide and a smaller portion of said contaminants than to said retentate, increasing the pH of said first permeate to convert said residual peroxide in said first permeate into an ionized form, separating said first permeate via a reverse osmosis membrane into a second retentate and a second permeate, said second permeate having a lower concentration of said peroxide in ionized form than said first permeate and said second retentate having a higher concentration of said peroxide in ionized form than said first permeate.

5. A method as defined in claim 4 wherein said first separation membrane is a reverse osmosis membrane.

6. A method as defined in claim 4 wherein said first separation membrane is an ultra filtration membrane.

7. A method as defined in claim 4 wherein said pH of said first permeate is increased to a pH of above 12.

8. A method as defined in claim 7 wherein said second retentate is applied to a further portion of said pulp.

9. A method as defined in claim 5 wherein said pH of said first permeate is increased to a pH of above 12.

10. A method as defined in claim 9 wherein said second retentate is applied to a further portion of said pulp.

11. A method as defined in claim 6 wherein said pH of said first permeate is increased to a pH of above 12.

12. A method as defined in claim 11 wherein said second retentate is applied to a further portion of said pulp.

* * * * *